No. 685,908. Patented Nov. 5, 1901.
J. COLGROVE.
POTATO HARVESTER.
(Application filed Dec. 24, 1900.)

(No Model.) 4 Sheets—Sheet 1.

Witnesses
James Colgrove,
Inventor,
by C. A. Snow & Co.
Attorneys

No. 685,908. Patented Nov. 5, 1901.
J. COLGROVE.
POTATO HARVESTER.
(Application filed Dec. 24, 1900.)

(No Model.) 4 Sheets—Sheet 3.

Witnesses
Howard D. Orr

James Colgrove, Inventor.
by C. A. Snow & Co.
Attorneys

No. 685,908. Patented Nov. 5, 1901.
J. COLGROVE.
POTATO HARVESTER.
(Application filed Dec. 24, 1900.)

(No Model.) 4 Sheets—Sheet 4.

Witnesses
Howard D. Orr.

James Colgrove, Inventor,
by C. A. Snow & Co.
Attorneys

UNITED STATES PATENT OFFICE.

JAMES COLGROVE, OF CLEARWATER, MINNESOTA.

POTATO-HARVESTER.

SPECIFICATION forming part of Letters Patent No. 685,908, dated November 5, 1901.

Application filed December 24, 1900. Serial No. 40,962. (No model.)

*To all whom it may concern:*

Be it known that I, JAMES COLGROVE, a citizen of the United States, residing at Clearwater, in the county of Wright and State of Minnesota, have invented a new and useful Potato-Harvester, of which the following is a specification.

My invention is an improved potato-harvesting machine, the object of my invention being to provide an improved machine which is efficient in digging the potatoes, separating the same from the vines and earth, and in delivering the potatoes in sacks, which are appropriately placed on the machine to receive them.

Figure 1:
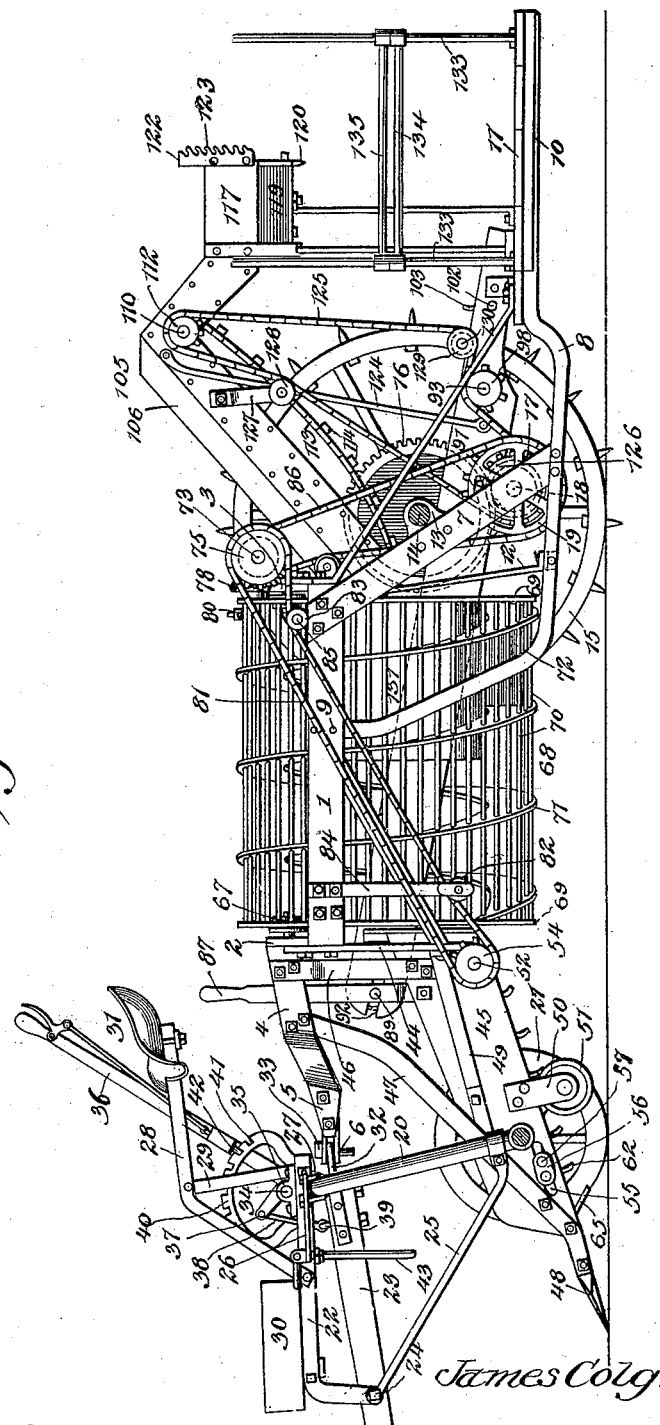
Figure 2:
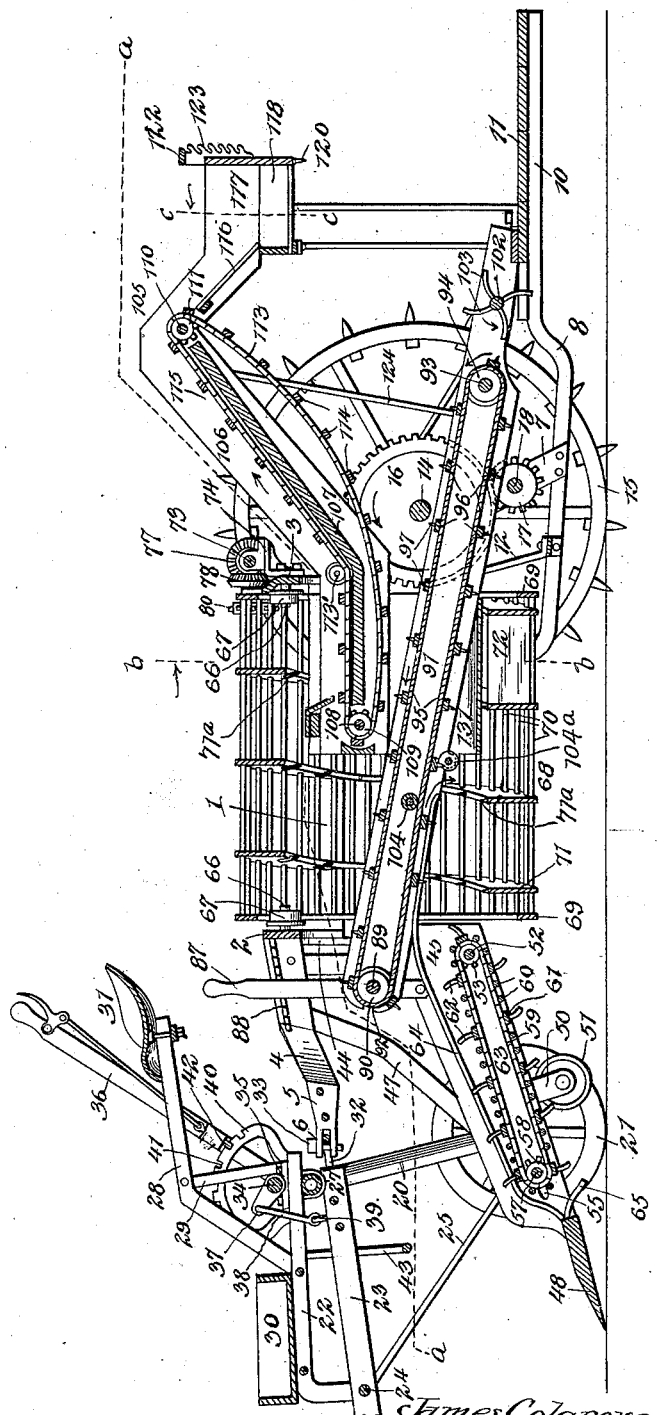
Figure 3:
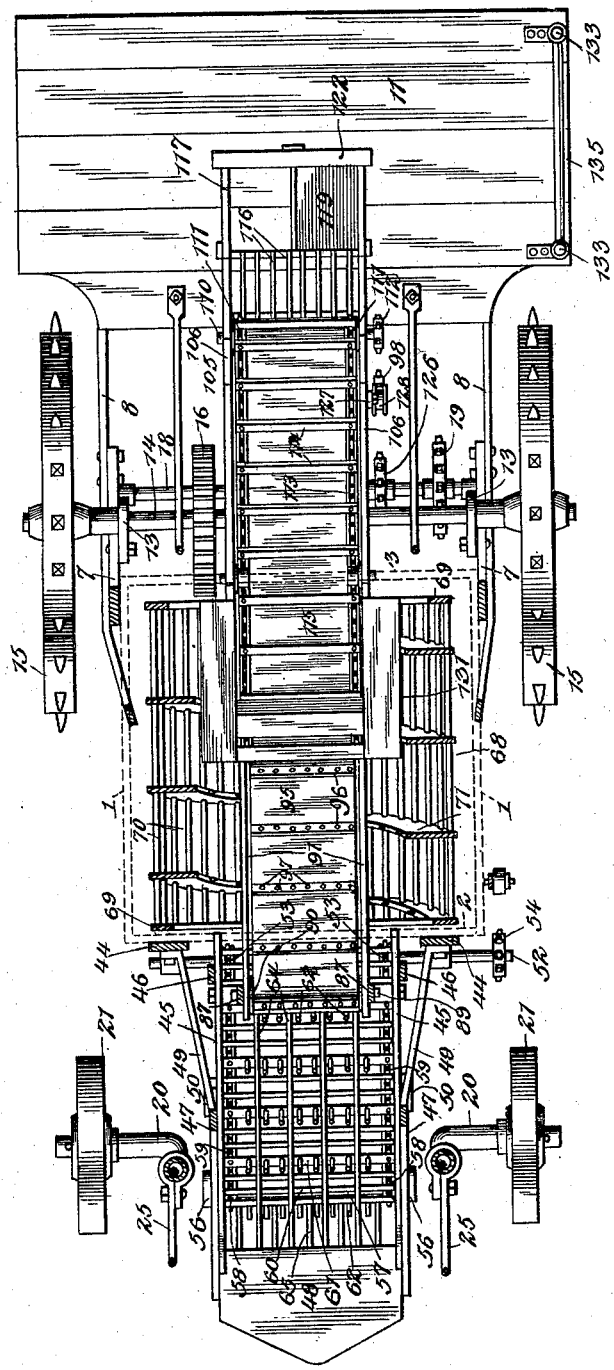
Figure 4:
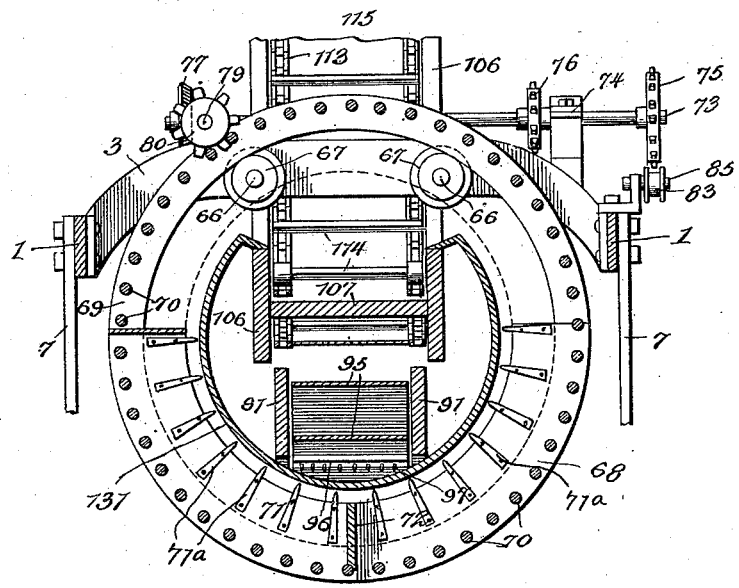
Figure 6:
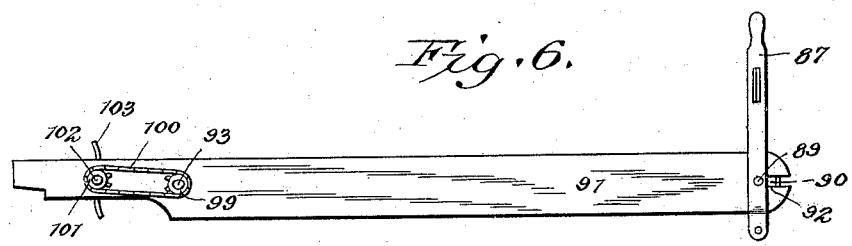
Figure 5:
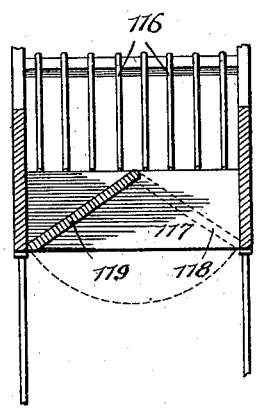

In the accompanying drawings, Figure 1 is a side elevation of a potato-harvester embodying my improvements. Fig. 2 is a vertical longitudinal central sectional view of the same. Fig. 3 is a horizontal sectional view taken on a plane indicated by the line *a a* of Fig. 2. Fig. 4 is a vertical transverse sectional view taken on a plane indicated by the line *b b* of Fig. 2. Fig. 5 is a similar view taken on a plane indicated by the line *c c* of Fig. 2. Fig. 6 is a detail view of the lower conveyer side board.

I will first describe the main frame, which supports the operating mechanisms.

A pair of longitudinally-disposed side bars 1 are connected together at their front and rear ends by cross-bars 2 3, respectively. To the front cross-bar 2 are secured a pair of forwardly-extending draft-bars 4, which converge and are united at their front ends, as at 5, and formed with one section of a coupling 6. A pair of inclined bars 7 have their upper ends bolted on the rear portions of the side bars 1. A pair of longitudinally-disposed bars 8 are bolted to the lower portions of said inclined bars 7. The front ends of said bars 8 are upturned and bolted to the side bars 1 at a suitable distance in advance of the bars 7, as at 9. Said bars 8 thereby brace said bars 7, and said bars 8 are further provided with rearwardly-extending arms 10, which support a platform 11. The cross-bar 3 is connected to the bars 8 by brace-rods 12.

Bearings 13 are bolted to the inclined bars 7, and in the said bearings is journaled an axle-shaft 14. On the ends of the axle-shaft are the supporting traction-wheels 15. Said wheels and said axle-shaft are provided with the usual pawl-and-ratchet mechanism to enable the machine to be readily turned. A master-wheel 16 is keyed to the axle-shaft, near one end thereof, and engages a pinion 17 on a shaft 18, the latter being journaled in bearings in the bars 7. A sprocket-wheel 19 is keyed to shaft 18, near one end thereof.

An arched axle 20 is provided with a pair of wheels 21. A pair of longitudinally-disposed parallel bars 22, of suitable length, have their rear ends secured firmly on the central portion of the said arched axle. The front ends of said bars 22 are downturned, and between said downturned ends of said bars is disposed the tongue 23, which is pivotally connected to said bars 22 by a bolt 24. The upper ends of a pair of brace-rods 25 are secured on said bolts, and the lower ends of said brace-rods are attached to the vertical portions of the arched axle at a point a slight distance above the spindles thereof, as shown in Fig. 1. A U-shaped bar 26 is secured to said bars 22 and is also secured to the central portion of the arched axle by clip-bolts 27. A pair of seat-supporting bars 28 have their front ends bolted to the bars 22. Brace-rods 29 are connected to said seat-supporting bars and to the rear portions of the bars 22. The latter support a tool-box 30. The U-shaped bar 26 in addition to strengthening the connection between the bars 22 and the arched axle serves as a foot-rest for the driver on the seat 31. The rear end of the tongue is provided with an eye-link 32, which engages the coupling member 6 at the front end of the main frame and is engaged by a coupling-bolt 33. A rock-shaft 34 is mounted in bearings 35, which are bolted on the rear portions of the bars 22. A hand-lever 36 is secured to said rock-shaft and is provided with a right-angled rock-arm 37, which is connected by a link 38 to the rear portion of the tongue, as at 39. A segment 40 is secured on one of the bars 22 and is provided with a series of adjusting-notches 41. The lever 36 is provided with the usual locking-dog 42, which by engagement with one of the notches 41 enables the said lever to be secured at any desired position, and hence enables the rear end of the tongue and the front end of the main frame to be raised or lowered, as may be required. A U-shaped guide 43 is secured to and depends from the bars 22, the rear portion of the tongue passing through and being maintained in said guide.

A pair of vertical bars or plates 44 are bolted to and depend from the ends of the front cross-bar 2. A pair of side boards 45, which are spaced a suitable distance apart and are longitudinally disposed and inclined downward forwardly, have their rear portions bolted to the lower ends of bars or plates 46, which are bolted to and depend from the rear portions of the draft-bars 4. A pair of inclined brace-bars 47 connect the front portions of the side boards 45 to the rear portions of said draft-bars, and between the front ends of said brace-bars 47 is secured a suitable digger, here shown as a plow or scoop 48, which is adapted to run under the potatoes and uproot them. A pair of brace-bars 49 connect the side boards 45 to the lower portions of the bars or plates 44. The side boards 45 are provided with hangers 50, which carry wheels or idlers 51, which serve to support endless traveling chains 59. The side boards 45 are provided near their rear ends with bearings for a shaft 52, which is provided with a pair of sprocket-wheels 53, disposed within or between the boards 45 and provided at one end with a sprocket-wheel 54. The said boards 45 are provided near their front ends with longitudinal slots 55, in which are mounted adjustable bearings 56, that carry a shaft 57, which has sprocket-wheels 58. Endless traveling chains 59 connect the sprocket-wheels 53 58 and are connected together by suitably-spaced transverse rods 60. Bars 61 connect the said chains and are located at suitable distances apart and provided with outward-projecting spurs 62. Said shafts 52 57, chains 59, rods 60, and bars 61 form an endless traveling carrier 63, disposed in rear of the plow or scoop 48, and the side boards 45 form the frame for said carrier.

A series of parallel rods 64 extend rearward from the scoop or shovel, are disposed over the carrier 63, and terminate at a proper distance in rear of said carrier to dispose of the vines. The spurs 62 of said carrier operate between the said rods 64, the latter forming the grate over said carrier. Downturned tooth-rods 65 project from the rear side of the scoop or shovel 48 and are disposed intermediate of the grate-rods 64 and partially bridge the space between the said scoop or shovel and said carrier 63.

Projecting from the opposing faces of the cross-bars 2 3, at the centers thereof, are longitudinally-disposed spindles 66, which are in line with each other and on which are loosely mounted revoluble flanged supporting-rollers 67. A revoluble cylinder 68, which is composed of the annular end chimes 69 and connecting rods or bars 70, is supported by said rollers 67 and hangs therefrom, said rollers bearing under the upper sides of said chimes 69. Between the chimes a spiral partition 71 is located, the rods 70 passing through the same. Said rods are appropriately spaced apart. The said spiral partition forms a worm conveyer which extends from end to end of the cylinder, and near the rear end of the latter, on one side thereof, is a longitudinally-disposed bucket or partition 72, which by the rotation of the said cylinder is adapted to carry the contents of the latter upward and drop the same from an elevated point, as will be understood.

A shaft 73 is journaled in bearings 74 on the rear side of the cross-bar 3. Said shaft has a sprocket-wheel 75 at one end and a sprocket-wheel 76 adjacent thereto. Said shaft is further provided with a miter gear-wheel 77, which engages a similar gear 78 on a stub-shaft 79, which is journaled in a bearing in the cross-bar 3 and has a sprocket-wheel 80 at its front end, the spurs of which engage the rods 70 of the cylinder 68, and hence said cylinder is rotated thereby. An endless sprocket-chain 81 connects the sprocket-wheels 75 and 54. Said endless chain and sprocket-wheels serve to convey power from shaft 73 to shaft 52, as will be understood. The lower lead of the said chain 81 is engaged by idlers 82 83. The former is adjustable in a hanger 84, which is bolted to one of the side bars or plates 1, and the latter is journaled on a spindle 85, that projects from one side of the frame. An endless sprocket-chain 86 engages the sprocket-wheel 76 and the sprocket-wheel 19 on shaft 18. Hence power is conveyed from shaft 18 to shaft 73.

A pair of levers 87, which are preferably spring-levers, are pivoted at their lower ends on the inner sides of the boards 45, which form the frame of carrier 63. The said levers engage toothed plates 88, which are longitudinally disposed on the inner sides of the draft-bars 4, and thereby said levers may be secured at any desired adjustment. A shaft 89 is journaled in bearings formed in said levers. Said shaft is carried by said levers and is adjustable therewith, and the said shaft is provided with a roller 90. The side boards 91, which form the longitudinally-disposed carrier-frame that extends entirely through the cylinder 68 and at its rear end rests upon the platform 11, are provided in their front ends with slots 92, in which the shaft 89 operates. A shaft 93 is journaled in bearings in the boards 91 at a suitable distance from the rear ends of the latter and is provided with a roller 94. A carrier-apron 95, which is made of canvas or other suitable flexible material, connects the rollers 89 94. Said carrier-apron is provided on its outer side with cross-slats 96, which are provided with projecting spurs 97, said slats being appropriately spaced apart. The shaft 93 has a sprocket-wheel 98 at one end and is provided at the opposite extremity with a sprocket-wheel 99, which is connected by an endless sprocket-chain 100 to a similar sprocket-wheel 101 on a picker-shaft 102, which is journaled in bearings in the boards 91, about midway between the roller 94 and the front side of the platform 11. Said picker-shaft 102 is provided with picker-spurs 103, which are constructed as shown. It will be understood that power is conveyed from the shaft 93 to the picker-shaft and that the latter rotates when the carrier-apron 95 is in operation. The lower lead of the carrier-apron 95 at a point intermediate of the rollers 89 94 runs under a roller 104, which is carried by the side boards 91 and which serves to depress said lower lead of the carrier-apron and cause the same to bear on the rods 64. It will be understood that by adjusting the levers 87 the said carrier-apron may be tightened as may be required to keep the same from sagging.

A frame 105, which is of the form shown and comprises the side plates 106, has its front end disposed in the rear portion of the cylinder 68 over the carrier 95 and then extends upward and rearward from the cylinder, as shown. The sides 106 of said frame are connected together by boards 107. A shaft 108 is journaled in bearings in the front ends of said side boards or plates and is provided with sprocket-wheels 109. A similar shaft 110 is journaled in an elevated position in bearings in said side boards or plates at a suitable distance in rear of the cylinder and is provided with sprocket-wheels 111. A sprocket-wheel 112 is secured on one end of said shaft 110. Endless traveling sprocket-chains 113 engage and connect the sprocket-wheels 109 111 and travel on the upper sides of the boards 107. The front portions of the upper leads of said chains are horizontally disposed, and the rear portions of said leads thereof are inclined, as shown in Fig. 2. The said chains engage direction-idlers 113'. Suitable cross-bars 114 connect the chains 113 together and are appropriately spaced apart. Said chains, cross-bars, and the shafts which carry and actuate them constitute an endless carrier 115, which I call the "potato-carrier," and the said carrier discharges onto downwardly rearwardly inclined grate-bars 116, which conduct and discharge into a hopper 117. The lower portion of the same is open on opposite sides, as at 118, and is provided with a vibrating cut-off 119, which is adapted to be swung to either side of its pivot and to close either of said openings. When one of the openings is closed, it will be understood that the remaining opening is unclosed or opened and free to permit the discharge of the potatoes. The said hopper, together with the said cut-off, will be hereinafter referred to as a "sacker." The said sacker is provided on its under side at its center with double hooks 120, and it is provided with a hook on each side near the front end of the hopper. An inverted-U-shaped metallic strap 122 is secured on the rear side of the hopper, the vertical arms thereof being provided with series of hooks 123, formed therein. The said hooks serve for the attachment of a sack to the hopper and admit of a sack of any suitable size being attached thereto, the sack resting on the platform while being filled or being suspended by the said hooks, according to the length of the sack. Brace-rods 124 connect the rear portions of the frames 91 105. An endless sprocket-chain 125 engages a sprocket-wheel 126 on shaft 18, passes over sprocket-wheel 98 on roller-shaft 93, and passes over sprocket-wheel 112 on shaft 110. Thereby power is conveyed from the shaft 18 to the carrier 95, picker-shaft 102, and potato-carrier 115, the same being operated in the directions indicated by the arrows in Fig. 2. A hanger 127 is attached to one of the side boards or plates 106 and carries an idler 128, which engages one lead of the chain 125. One lead of said chain is engaged by a direction-idler 129, which is journaled on a spindle 130, carried by the frame 91.

A curved guard-plate 131, which is concentric with the cylinder 68 and is disposed in the rear portion thereof, passes under the carrier 95 and is attached to and supported by the side boards or plates 106. Said guard-plate, in connection with the bucket or partition 72, serves to carry the potatoes upward as they reach the rear portion of the cylinder 68 and drop the same on the potato-carrier 115, by which they are conveyed, as hereinbefore stated, to the sack, the grate-bars 116, on which the potatoes are discharged by the potato-carrier, serving to sift and discharge from the potatoes any loose earth which may be carried by the potatoes and prevent the said earth from being discharged into the sack together with the potatoes. It will be understood that the rotary motion of the cylinder 68 serves to roll the potatoes in the lower side thereof to separate the same and to discharge the earth therefrom and that the spiral partition causes the potatoes to travel rearwardly in said cylinder.

On one side of the platform 11 are a pair of standards 133, which are connected together by a horizontally-disposed bar 134, that is fast thereon. A vertically-movable bar 135 also connects said standards. The empty sacks are hung on the bar 134 and engaged by the vertically-movable bar 135, which serves to retain them thereon and permit of their being withdrawn one at a time therefrom as the sacks are filled.

In the operation of my invention the shovel or scoop serves to scoop up the potatoes, the same, together with the earth and tops or vines, being deposited thereby onto the endless carrier 63, which, running rapidly, sifts out the major portion of the dirt and delivers the potatoes and the unbroken lumps of earth into the front end of the cylinder. The rods 64, which are above the carrier, catch and support the vines and leaves, and the same being engaged by the spurs 62 of the carrier pass rearward on said rods and are caught by the spurs of the carrier-belts 95 and conveyed by the said carrier 95 and discharged therefrom at a point in rear of the cylinder. The roller 104ᵃ at the rear of the rods 64 and coacting with the carrier-apron prevents potatoes from being carried out with the vines. When a potato becomes caught between one of the rods and the carrier-apron, the rod is depressed by the action of the apron, causing the rod to release and drop the potato, which falls into the cylinder. Vines are, however, caught by said roller 104ᵃ and prevented from dropping before reaching a point above the guard-plate 131 and from catching on the front side of said guard-plate. The revoluble picker 102 103 coacts with the said carrier 95 to prevent the vines or weeds from adhering to the latter and being carried forward by the upper lead thereof.

The front end of the spiral 71 is provided with a series of inwardly-projecting teeth or spurs 71ᵃ, secured thereto at a suitable distance apart. These teeth or spurs catch such weeds and vines as drop from the rods 64 and by the rotary motion of the cylinder elevate the same and drop them upon the carrier-apron 95, which carries them forward and then rearward on the rods 64 and thence over the roller 104ᵃ with the other vines.

Having thus described my invention, I claim—

1. In a potato-harvester, the combination of the main frame, the carrier at the front end thereof, the digger in advance of said carrier, the longitudinally-disposed bars over said carrier, the cylinder in rear of the carrier and the endless traveling vine-carrier apron disposed longitudinally in the cylinder, said vine-carrier apron having projecting spurs, for the purpose set forth, substantially as described.

2. In a potato-harvester, the combination of the main frame, the revolving cylinder carried thereby, the digger at the front end of said frame, an endless movable carrier between said digger and the front end of said cylinder and discharging into the latter, said endless movable carrier having projecting spurs, longitudinal bars extending rearwardly from said digger over said carrier, the endless traveling vine-carrier and the potato-carrier, the latter being fed by said revoluble cylinder and said vine-carrier being fed by said inclined longitudinal bars, substantially as described.

3. In a potato-harvester, the combination of a supporting-frame, a revoluble cylinder, for the purpose set forth, an endless carrier in advance of said cylinder and adapted to discharge therein, a digger discharging onto said endless carrier, longitudinally-disposed rearwardly-ascending bars extending from said digger over said carrier, said bars serving to separate the vines from the potatoes and said carrier serving to convey the potatoes to said cylinder, a vine-carrier having an endless traveling element coacting with said inclined bars to convey the vines therefrom, and a potato-carrier fed by said cylinder, substantially as described.

4. In a potato-harvester, the combination of a digger, an endless traveling potato-carrier in rear thereof, said potato-carrier having projecting spurs, longitudinally-disposed bars extending rearwardly from said digger over said carrier, a revoluble cylinder in rear of said carrier into which the potatoes are discharged, and an endless traveling vine-carrier extending through said cylinder, coacting with said bars to take the vines therefrom, and conveying the vines through said cylinder, substantially as described.

5. In a potato-harvester, the combination of a main frame, a revolving cylinder therein for the purposes set forth, an endless carrier in advance of said cylinder and discharging into the latter, a digger in advance of said carrier, inclined bars extending rearwardly and upwardly from said digger over said carrier and into said cylinder, an endless traveling vine-carrier comprising an endless traveling apron, a fixed supporting-roller and an adjustable supporting-roller therefor, and adjusting-levers which carry said adjustable supporting-roller, substantially as described.

6. In a potato-harvester, the combination of a digger, an endless traveling potato-carrier in rear thereof, said potato-carrier having projecting spurs, longitudinally-disposed bars extending rearwardly from said digger over said carrier, a revoluble cylinder in rear of said carrier into which the potatoes are discharged, an endless traveling vine-carrier extending through said cylinder, coacting with said bars to take the vines therefrom, and conveying the vines through said cylinder, and a revoluble picker in rear of said vine-carrier to strip the vines therefrom, substantially as described.

7. In a potato-harvester, the combination of a supporting-frame, a revoluble cylinder for the purpose set forth, an endless carrier in advance of said cylinder, and adapted to discharge therein, a digger in advance of said endless carrier, longitudinally-disposed rearwardly-ascending bars extending from said digger over said carrier, said bars serving to separate the vines from the potatoes and said carrier serving to convey the potatoes to said cylinder, a vine-carrier having an endless traveling element coacting with said inclined bars to convey the vines therefrom, a potato-carrier fed by said cylinder and a sacker into which said potato-carrier discharges, substantially as described.

In testimony that I claim the foregoing as my own I have hereto affixed my signature in the presence of two witnesses.

JAMES COLGROVE.

Witnesses:
P. P. COLGROVE,
ALICE COLGROVE.